W. R. Nevins.
Cracker Cutter.
Nº 7,580.                     Patented Aug. 20, 1850.

W. R. Nevins
Cracker Cutter.
N° 7,580.   Patented Aug. 20, 1850.

Sheet 2
2 Sheets.

UNITED STATES PATENT OFFICE.

WILLIAM R. NEVINS, OF NEW YORK, N. Y.

MACHINE FOR CUTTING CRACKERS.

Specification of Letters Patent No. 7,580, dated August 20, 1850.

*To all whom it may concern:*

Be it known that I, WILLIAM R. NEVINS, of the city, county, and State of New York, have invented a new and useful Improvement on Machines for Rolling Dough and Cutting it into Crackers and Biscuits, and which was patented by me on the 2nd day of March, 1836; and I hereby do declare that the following is a full, clear, and exact description, reference being had to the annexed drawings, forming a part of this specification, in which—

Figure 1:
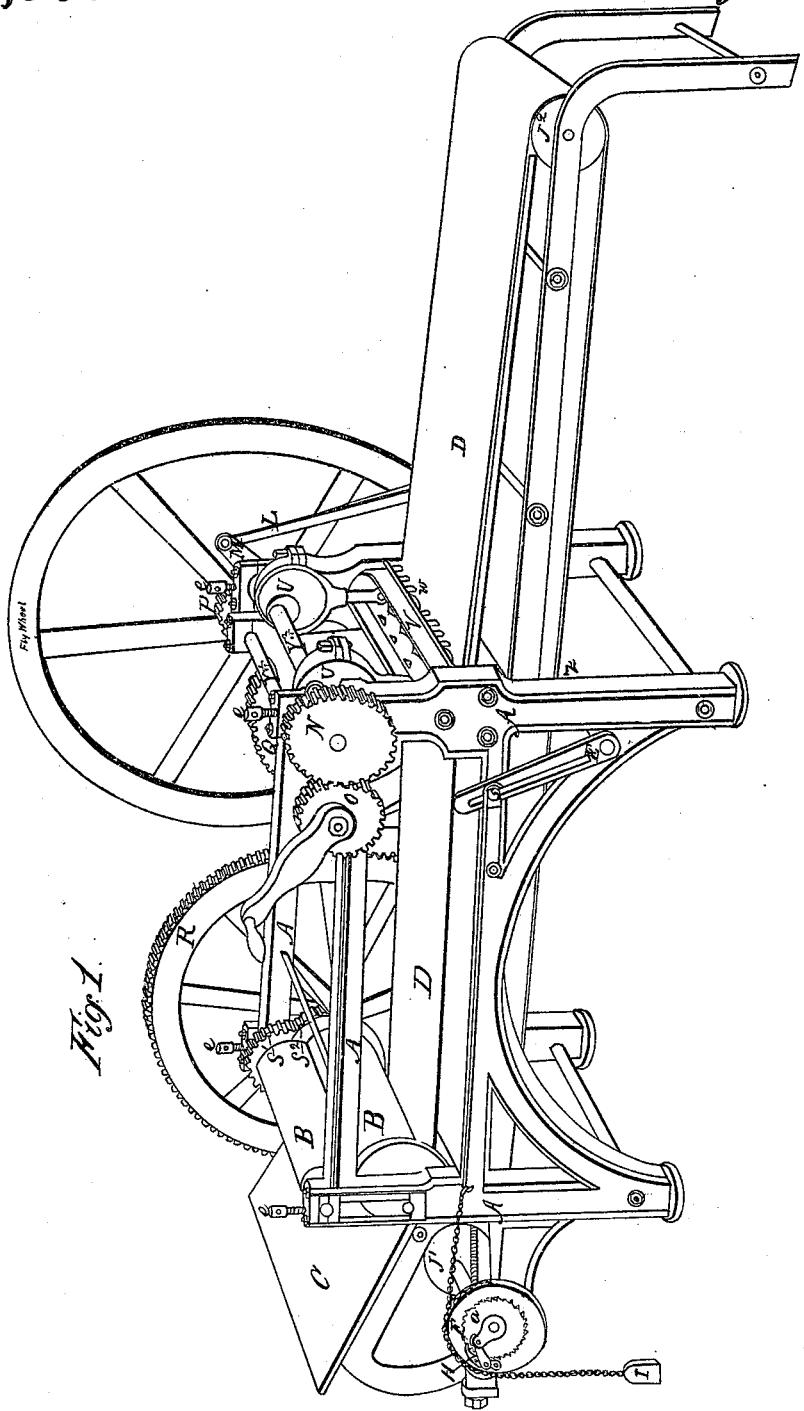
Figure 4:
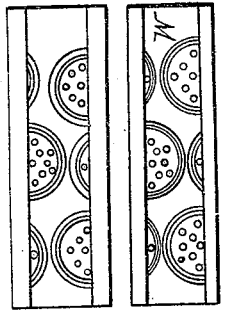
Figure 3:
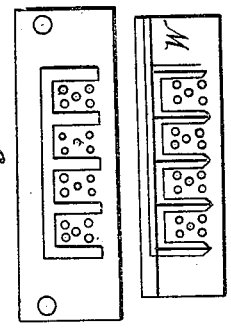
Figure 2:
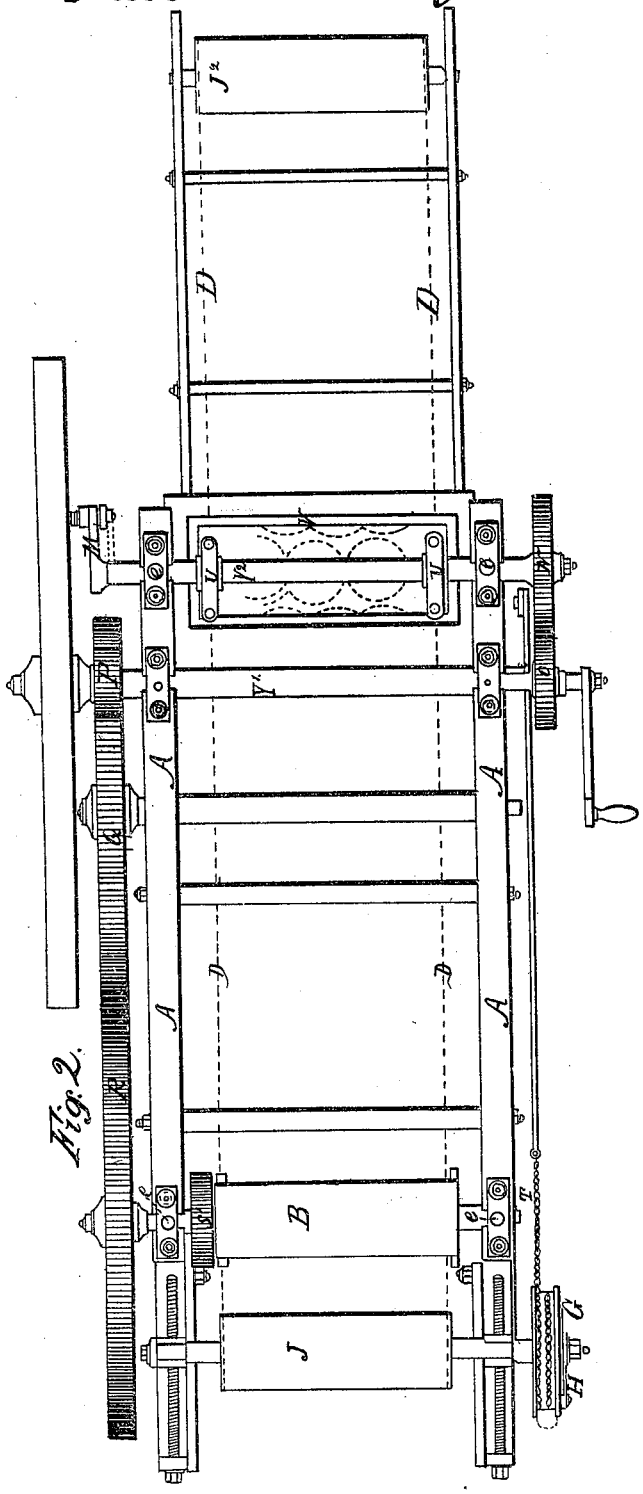

Figure 1, is a perspective view. Fig. 2, is a plan view. Fig. 3 and Fig. 4 are sections of the cutters.

The same letters of reference indicate like parts.

The nature of my invention consists in giving the rollers a constant velocity, and adjusting the number of strokes of the cutters thereto; and also in adjusting the feed of the apron to the number of strokes of the cutters.

To enable others skilled in the art to make and use my invention, I will proceed to describe its construction and operation.

A is the frame, which is made in the usual way.

B B are the dough rollers. They are made of any material most suitable, such as polished iron. They are both of the same size, and feed in and reduce the dough to its proper thickness. C is the feeding board to receive the dough to be taken in between the rollers. D is an endless apron to receive the dough from the rollers, and carry it forward.

(e e) are two set screws to regulate the pressure on the journals of the dough rollers. R is a cog wheel secured on the axis of the under roller B. It is about thirty inches in diameter with one hundred and eleven cogs on it. It meshes into the intermediate wheel Q which is secured on a shaft attached to the frame.

P is a pinion on the main driving shaft Y'. When the main driver is operated, either by the handle, or other means, motion will be communicated to the wheel R and consequently to the under dough roller, which by having a cog wheel $S^2$ meshing into a cog wheel S' on the top dough roller, both rollers act or move, to gather in the dough from the table C and press it into the desired thickness, and discharging it on to the endless apron D. By a uniform motion being communicated to the dough rollers B B, the dough rollers will therefore have a uniform speed.

$Y^2$ is a shaft secured in proper bearings in the frame. This shaft is driven by a pinion on the spur wheel O which is secured on the main or driving shaft, the said wheel O meshing into the cog wheel N. The pinions or wheels O and N are secured by nuts on their respective shafts and can be changed at pleasure to give any degree of speed to the shaft $Y^2$ which is the cutter shaft. The cutter box V with the cutters W secured to it in the usual manner, are attached to the said shaft $Y^2$ by connecting rods, and eccentrics U U, so that when the shaft $Y^2$ is revolving, the cutter box with the cutters will be lifted up and depressed during every revolution of the said shaft—a reciprocating motion thus being communicated to the cutters by the rotary motion of the said shaft.

As different degrees of speed may be communicated to the cutter shaft by the main driver, as set forth, it is necessary that the endless apron with the dough on it, should receive a progressive intermittent motion to coincide with the motion of the cutters. This is accomplished as follows. M is a crank attached to the outer end of the cutter shaft, and to this crank is connected a rod L, which is connected with a cross shaft Z, which shaft has a rocking bar or arm E attached to it: T is a rope or chain attached to the pin 5 placed in the slot of the rocking arm. This rope or chain passes over the pulley F which is secured on the journal of the roller J'. The endless apron D passes around the rollers J' $J^2$; the endless apron is moved when the roller J' is moved. The rocking arm E operates the roller J' by the rope on the pulley, to draw or move forward the apron D with the dough on it, carrying the said dough below the cutters, and the cut dough from the cutters. The exact distance which the endless apron is moved forward every oscillation of the rocking shaft, is regulated by shifting the pin (5) up, or down in the slot of the rod in which it is fixed to make the endless apron move forward a greater or less space every oscillation, according to the kind of biscuit to be cut, and according to the motion of the cutter shaft. To the chain T, there is a weight I to hold the roller firm and immovable during the intermission of the forward motion of the apron D. G is a ratchet wheel attached to the outside of the pulley F and H is a ratchet which works into the teeth of the said ratchet wheel. On the outside of the ratchet wheel is a small projecting arm to which the ratchet is attached. Between the nut on the end of the journal of the roller J' and the small arm, there is a spiral spring which presses on the said arm to keep the ratchet into the teeth of the wheel. But as these devices to give the intermittent motion to the apron, are well known and embraced in my patent of 1836, they need not be farther described.

In my former patent of 1836 the chain or rope T was directly connected to the main driving shaft, and the reciprocating motion to move the roller J' was communicated by a slot in the fly wheel. This my former arrangement to move the said roller, in my former patent defeated the main object of the flywheel, as an accumulator of power. In my former patent of 1836, the cutters were directly attached to the main driving shaft, therefore the speed of the main driver had to be varied for every desired speed of the cutters, and the motion or speed of the dough rollers was very unequal.

By my present invention and the improvements herein set forth, viz placing the cutters upon a secondary shaft, and connecting the moving of the endless apron therewith, the cutters may have various speeds while the motion or speed of the main driver, and consequently, the dough rollers, is uniform, with the flywheel left to perform its appropriate office freely. My present improvement, therefore, relates to a superior manner or arrangement for operating the cutters and the moving of the endless apron in combination with the same whereby my machine is made more convenient, prevents a too great speed of the dough rollers, (to obviate the heating of the dough) and it is easier to operate by any power applied for that purpose.

Having thus explained my invention I claim—

1. The combination of the three following elements: 1st the constant velocity of the breaking rollers.

2. The number of strokes of the cutters adjustable thereto by means substantially as described, so that within certain limits they may be varied in relation to the number of revolutions of the feed rollers.

3. An adjustable feed to the apron derived from the shaft carrying the cutters, so that it always makes the same number of strokes, but each stroke may be varied in length by which in the same machine, I am enabled to cut crackers of any given size.

WILLIAM R. NEVINS.

Witnesses:
R. MACFARLANE,
ALEX. W. MACDONALD.